United States Patent
Buckenauer et al.

(10) Patent No.: US 9,790,116 B2
(45) Date of Patent: Oct. 17, 2017

(54) VERTICAL CRUCIBLE PULLING METHOD FOR PRODUCING A GLASS BODY HAVING A HIGH SILICIC-ACID COMPONENT

(71) Applicant: Heraeus Quarzglas GmbH & Co. KG, Hanau (DE)

(72) Inventors: Thomas Buckenauer, Kleinostheim (DE); Remo Pohl, Friedrichsdorf (DE); Robert Stenger, Geiselbach (DE); Alexander Böhler, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 201 days.

(21) Appl. No.: 14/569,615

(22) Filed: Dec. 12, 2014

(65) Prior Publication Data

US 2015/0166387 A1    Jun. 18, 2015

(30) Foreign Application Priority Data

Dec. 18, 2013 (EP) .................... 13197976

(51) Int. Cl.
*C03B 3/00* (2006.01)
*C03B 5/24* (2006.01)
(Continued)

(52) U.S. Cl.
CPC .............. *C03B 3/00* (2013.01); *C03B 5/0336* (2013.01); *C03B 5/24* (2013.01); *C03B 17/04* (2013.01)

(58) Field of Classification Search
CPC  C03B 3/00; C03B 17/00; C03B 37/02; C03B 2205/30; C03B 2205/44;
(Continued)

(56) References Cited

U.S. PATENT DOCUMENTS 3,244,494 A * 4/1966 Apple ...................... C03B 3/00
                                                                  222/55
3,248,206 A * 4/1966 Apple ...................... C03B 5/02
                                                                 373/33
(Continued)

FOREIGN PATENT DOCUMENTS

| DE | 2217725 A    | 8/1974  |
|----|--------------|---------|
| DE | 3815974 C1   | 8/1989  |
| JP | 10-287435 A  | 10/1998 |

OTHER PUBLICATIONS

Espacenet English language abstract of JPH 10-287435 A, published Oct. 27, 1998.

*Primary Examiner* — Jason L Lazorcik
(74) *Attorney, Agent, or Firm* — Tiajoloff & Kelly LLP

(57) ABSTRACT

The present invention refers to a method for producing a glass body with high silicic-acid content by drawing a softened glass mass from an elongated, substantially cylindrical crucible in that $SiO_2$ granules are supplied from above into the crucible, the $SiO_2$ granules are heated to a softening temperature, so that the softened glass mass which comprises a melt surface is formed, the softened glass mass is drawn off via a bottom opening of the crucible so as to form a glass strand, and the glass strand is cut to length to obtain the glass body, wherein due to the supply of the $SiO_2$ granules a bulk heap is formed that covers the melt surface in part while leaving a melt edge, and wherein the melt surface is optically detected. To improve the fusion behavior of the granules and to suppress or altogether prevent the formation of a sinter crust, it is suggested according to the invention that during the optical detection of the melt surface the width of at least a sub-section of the melt edge is determined consecutively and is set to a value within a target width range through the supply rate of the $SiO_2$ granules.

21 Claims, 1 Drawing Sheet

(51) Int. Cl.
*C03B 17/00* (2006.01)
*C03B 5/033* (2006.01)
*C03B 17/04* (2006.01)

(58) Field of Classification Search
CPC ......... C03B 5/0336; C03B 5/24; C03B 5/245; C03B 17/04
USPC .................. 65/135.9, 136.5, 384, 29.19, 162
See application file for complete search history.

(56) References Cited

U.S. PATENT DOCUMENTS

| | | | | |
|---|---|---|---|---|
| 3,764,286 A * | 10/1973 | Antczak et al. | .......... | C03B 3/00 65/135.6 |
| 3,929,445 A * | 12/1975 | Zippe | ........................ | C03B 3/00 414/166 |
| 4,142,880 A * | 3/1979 | Wenda | ........................ | C03B 3/00 373/33 |
| 4,262,158 A * | 4/1981 | Lynch | ........................ | C03B 5/24 373/28 |
| 4,312,658 A * | 1/1982 | Mayer | ........................ | C03B 3/00 373/33 |
| 4,409,012 A * | 10/1983 | Miller | ...................... | C03B 5/245 356/426 |
| 4,422,326 A * | 12/1983 | Sasaki | ..................... | C03B 5/245 73/291 |
| 4,483,008 A * | 11/1984 | Varrasso | ................. | C03B 5/027 373/27 |
| 4,923,497 A * | 5/1990 | Leber | ....................... | C03B 3/00 65/111 |
| 5,180,562 A * | 1/1993 | Drechsel | ................. | C30B 15/12 117/213 |
| 5,340,372 A * | 8/1994 | Macedo | ................. | B09B 3/005 264/5 |
| 5,361,721 A * | 11/1994 | Takano | ................... | C30B 15/00 117/208 |
| 5,373,805 A * | 12/1994 | Takano | ................... | C30B 15/00 117/13 |
| 5,558,691 A * | 9/1996 | Horn | ........................ | C03B 3/00 414/156 |
| 5,584,930 A * | 12/1996 | Katsuoka | ................ | C30B 15/28 117/13 |
| 5,665,159 A * | 9/1997 | Fuerhoff | ................. | C30B 15/26 117/14 |
| 5,728,190 A * | 3/1998 | Pieper | ....................... | C03B 3/00 588/252 |
| 5,846,318 A * | 12/1998 | Javidi | .................... | C30B 15/02 117/13 |
| 6,187,090 B1* | 2/2001 | Maeda | ................... | C30B 15/22 117/14 |
| 6,454,851 B1* | 9/2002 | Fuerhoff | ................. | C30B 15/02 117/15 |
| 7,461,523 B2* | 12/2008 | Mersmann | ........... | F27B 14/061 65/158 |

* cited by examiner

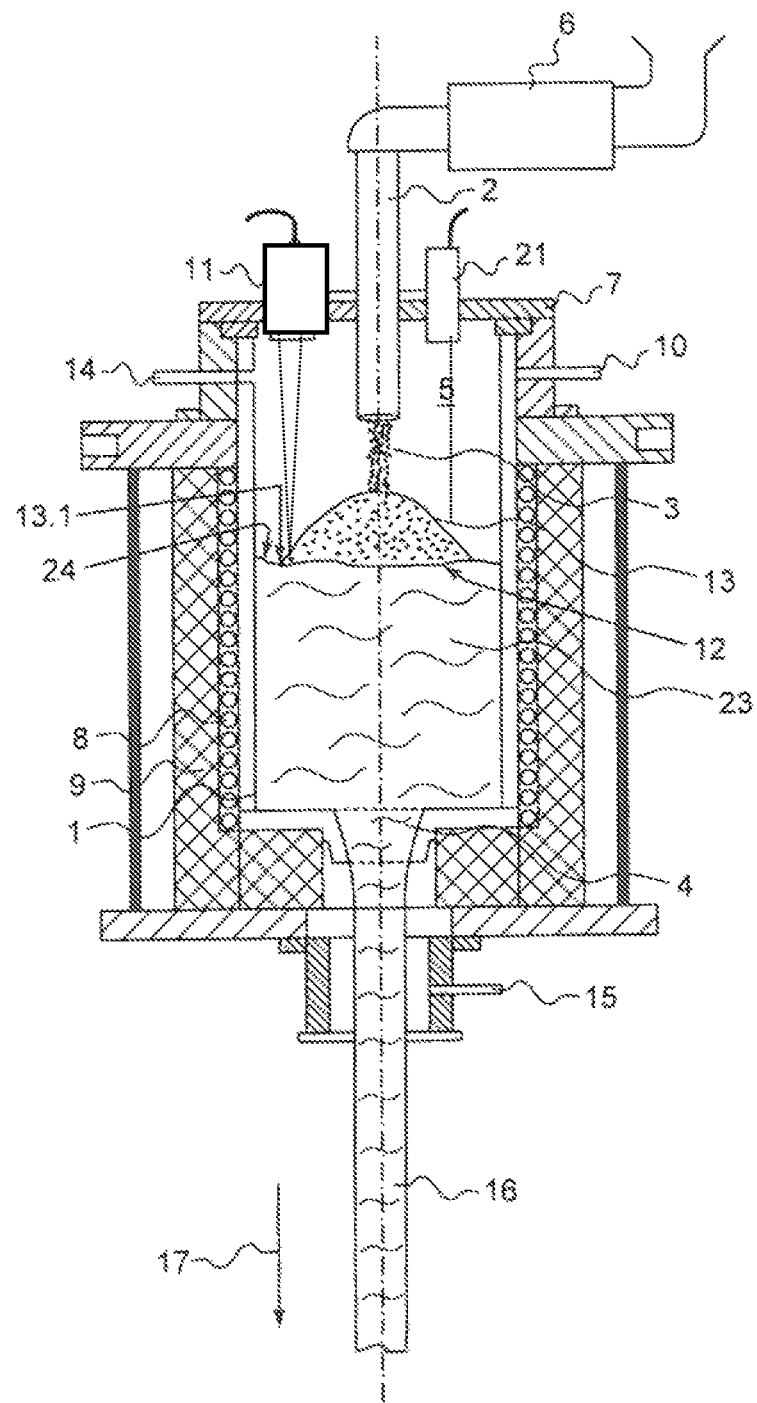

VERTICAL CRUCIBLE PULLING METHOD FOR PRODUCING A GLASS BODY HAVING A HIGH SILICIC-ACID COMPONENT

TECHNICAL BACKGROUND

The present invention refers to a method for producing a glass body with high silicic-acid content by drawing a softened glass mass from an elongated, substantially cylindrical crucible in that $SiO_2$ granules are supplied from above into the crucible, the $SiO_2$ granules are heated to a softening temperature, so that the softened glass mass which comprises a melt surface is formed, the softened glass mass is drawn off via a bottom opening of the crucible so as to form a glass strand, and the glass strand is cut to length to obtain the glass body, wherein due to the supply of the $SiO_2$ granules a bulk heap is formed that covers the melt surface in part while leaving a melt edge, and wherein the melt surface is optically detected.

PRIOR ART

A glass with high silicic-acid content within the meaning of the present invention has a $SiO_2$ content of at least 90% by wt. A melt of such a glass, which is hereinafter also called "quartz glass" for the sake of simplicity, is normally processed in so-called crucible pulling methods into a cylindrical glass strand and finally into components of quartz glass, particularly in the form of tubes and rods of any desired cross-sectional profile. Special attention is here paid to the prevention of inhomogeneities in the drawn-off glass strand.

DE 22 17 725 A discloses a method of the aforementioned type, which suggests the use of a crucible in which raw material in the form of silica particles is continuously supplied from above by means of an automatic feeder and is subsequently fused. A viscous homogeneous quartz glass mass is formed that in the lower portion of the crucible is drawn off downwards in the form of a quartz glass tube via a drawing nozzle provided in the bottom area of the crucible. The drawing nozzle is connected to a gas inlet tube for the supply of a gas directly into the shaping region. The gas inlet tube is guided, starting from the drawing nozzle, upwards through the whole crucible. A hopper which projects from above through an opening into the crucible and whose lower end terminates above the surface of the viscous glass mass (hereinafter called "melt surface") is provided for the supply of the particulate raw material. A visual inspection device is provided for detecting the level of the viscous glass mass. The $SiO_2$ particles fall out of the outlet tube of the hopper into the crucible due to gravity, and a bulk cone is formed in this process from the granular $SiO_2$ raw material floating on the melt surface.

Such bulk heaps of $SiO_2$ granules in a crucible have different geometrical shapes that may range from an ideal cone shape to more or less flat dome shapes or shapes with a waved cross-sectional profile. The different forms of such granulation bulk heaps are hereinafter subsumed under the terms "bulk cone" or "bulk heap". They may have an influence on the fusion behavior of the $SiO_2$ granules. DE 38 15 974 C1, for instance, discloses a bulk cone which extends up to the inner wall of the crucible. In this case the drawing nozzle is fastened to a holding rod which extends upwards through the crucible and through the supply nozzle for the $SiO_2$ raw material.

A similar method is known from JP 10-287435 A. Here, the $SiO_2$ raw material is supplied in a weight-controlled manner via a charging hopper projecting into the upper region in the crucible. Like in DE 38 15 974 C1, the drawing nozzle is held by a holding rod which extends through the crucible upwards. The raw material forms a bulk cone around this holding rod.

TECHNICAL OBJECTIVE

It has been found that such bulk cones are formed in a more or less uncontrolled manner, especially as regards the diameter of the base area of the bulk cone. The $SiO_2$ particles may be irregularly distributed over the melt surface, which results in an upward heat radiation that is inhomogeneous in terms of time and location, and promotes the formation of a so-called "sinter crust" on the inner wall of the crucible. The sinter crust is composed of incompletely fused raw material particles and of impurities that evaporate from the melt and condense or re-sublime on the inner wall of the crucible. Parts of this sinter crust may break off from time to time, whereby impurities may pass in phases and in an uncontrollable amount into the glass melt. This leads to variations in the melting conditions and thus also to changes in the quality of the drawn-off quartz glass component.

It is therefore the object of the present invention to indicate an inexpensive method for the production of homogeneous glass bodies from a glass with high silicic-acid content by drawing from the melt, which method suppresses or altogether prevents the formation of a sinter crust, thereby improving the fusion behavior of the granules.

GENERAL DESCRIPTION OF THE INVENTION

The aforementioned object, starting from the aforementioned method, is achieved according to the invention in that during the optical detection of the melt surface the width of at least a sub-section of the melt edge is determined consecutively and is set to a value within a target width range through the supply rate of the $SiO_2$ granules.

In the method according to the invention the current width of the melt edge is determined consecutively and is held at a value within predetermined limits. It is enough to detect the width only in a ring section of the surrounding melt edge.

The melt edge width depends on a plurality of parameters, especially on the temperature, on the mass of quartz glass drawn off per time unit (throughput) and on the supply rate of $SiO_2$ granules. The last-mentioned parameter serves according to the invention as a regulating variable for the melt edge width.

The optical detection of the melt surface is carried out "consecutively", i.e. continuously or from time to time (discontinuously), wherein with a discontinuous detection the process control is the more accurate, the shorter the time intervals between successive measurements are chosen. For the optical detection of the melt surface at least a sub-section of the melt edge is viewed from above. The width of the melt edge, defined as the distance of the edge of the bulk cone from the inner wall of the crucible, is here determined. For this determination it is enough to optically detect the position of the bulk cone edge when the distance of the measurement position from the inner wall of the crucible is known.

Depending on the actual size of the melt edge, the supply rate of $SiO_2$ granules is changed for a fine adjustment such that a size within a target width range is obtained. The target width range may here be a concrete predetermined value. Preferred is however a greater value range, so that an intervention, i.e. a change in the supply rate of the granules, is only required if the actual size of the melt edge width has left the range of values. In the case of an actual width that is too small, the supply of granules is reduced, and inversely, in the case of an excessively large melt edge width the supply of granules is increased.

The supply amount of $SiO_2$ granules is here controlled according to the invention such that the bulk cone does not contact the inner wall of the crucible, but a surrounding melt edge with a width within a target width range is formed, which range is preferably between 0.5 cm and 4 cm and particularly preferably between 1 cm and 2 cm.

When the melt edge becomes smaller than 0.5 cm, there is the risk of the development of a sinter crust which would form a bridge towards the crucible wall and would entail the drawbacks described with respect to the prior art. If the melt edge is wider than 4 cm, the free melt surface and the risk of evaporation from the melt are great, which may lead not only to variations of the melting conditions and together with this to changes in the quality of the drawn-off glass body, but also to an energy loss and to vapor formation which complicates the optical detection of the melt edge.

A surrounding, approximately annular melt edge in the aforementioned order can be measured without difficulty by way of optical detection. The measurement in a single ring section is however preferred because control difficulties are thereby avoided; these might arise when the shape of the melt edge differs from the ideal annular shape such that the melt edge width in one ring section is below the target value and is above the target value in another ring section.

Since the bulk cone from the supplied granules with high silicic-acid content does not touch the inner wall of the crucible, the formation of a sinter crust is prevented or slowed down. At the same time the melt surface is substantially covered by the bulk heap, so that stable melting conditions are obtained.

It has turned out to be advantageous when the optical detection of the melt surface comprises a temperature measurement.

Owing to the additional measurement of the temperature of the melt surface in the area of the melt edge it is possible to obtain information on the current extension of the bulk cone and the width of the melt edge even in the case of increased vapor formation that would complicate a pure optical control.

Advantageously, the temperature measurement is carried out by means of at least one pyrometer which is directed to a position on the edge of the bulk heap.

$SiO_2$ granules that have not fused are positioned on the edge of the bulk heap/bulk cone, so that a lower temperature is detected there than in the area of the melt surface. The transition from $SiO_2$ granules to the melt can thereby be detected in a locally precise manner, so that the width of the melt edge simultaneously follows from the temperature measurement.

With the use of a further pyrometer, which is e.g. directed towards the lateral surface of the bulk cone, an even lower temperature is detected due to the thicker granulation layer than on the edge of the base area of the bulk cone, and conclusions can be drawn therefrom with respect to the angle of repose of the bulk cone and these may possibly help to optimize the supply of the $SiO_2$ granules. The pyrometer may be equipped with an optical fiber which can be used for a pyrometric detection of a temperature inside the crucible and through which the temperature of the melt surface and the $SiO_2$ granules can be detected.

Furthermore, it has turned out to be useful when the optical detection of the melt surface comprises an imaging of the melt edge by means of at least one camera.

The at least one camera makes recordings of the melt edge from which the width of the melt edge becomes apparent. Optionally, the camera is directly equipped with corresponding measurement equipment that automatically detects or calculates and records the width of the melt edge.

As for the equipment, it has turned out to be useful for the optical detection of the melt surface to combine an imaging detection with a temperature measurement, wherein a camera is used with a pyrometer.

The two functions (imaging detection and temperature measurement) are combined in so-called thermal imaging cameras which are normally used in the monitoring of hot processes. Owing to the additional measurement of the temperature a particularly accurate process control is achieved. As an alternative to the pyrometric temperature detection, it is also possible to use a thermocouple which can be guided directly up to the melt surface or also to the bulk cone of the $SiO_2$ granules.

The method according to the invention is particularly advantageous when the camera is directed to a position on the edge of the bulk heap.

Due to the alignment with an exact position on the edge of the bulk heap/bulk cone, the distance from the wall of the crucible and thus the width of the melt edge are obtained at the same time. With this setting no special evaluation of images of the camera is needed. When the camera is combined with a temperature detection, the alignment with the position on the edge of the bulk cone is also advantageous because the temperature of the melt surface at this very place is of special importance to the fusion behavior of the $SiO_2$ granules. The use of several cameras, optionally also in combination with a device for temperature measurement, for the optical detection of the melt edge at various places can improve the process control.

A further advantageous configuration of the method according to the invention is that the $SiO_2$ granules are supplied via an individual filling tube terminating centrally above the bulk heap, and that a distance ranging from 5 cm to 20 cm is set between the end of the filling tube and the bulk heap.

The distance is previously set by positioning the filling tube in vertical direction and is corrected during the drawing process in case of need. It is ensured with this arrangement of the filling tube that the bulk cone is built up centrally in the crucible on the melt surface, which promotes the formation of a uniform surrounding melt edge around the bulk cone. The bulk heap is here spaced apart from the filling tube. At a distance smaller than 5 centimeters, there is the risk that filling tube and bulk heap may touch one another, so that the filling tube is filled and a sinter layer is formed between filling tube and bulk heap, the sinter layer covering the bulk heap proper and making it uncontrollable. The distance should however not exceed 20 cm because there is otherwise the risk that granules exiting out of the filling tube are partly driven away due to the gas flow conditions prevailing in the upper region of the crucible; this leads to an irregular deposition of $SiO_2$ granules and thus to a non-reproducible bulk heap geometry. This may even reach the point that $SiO_2$ granules pass up to the wall of the crucible where undesired sinter crusts will then be formed.

It has furthermore turned out to be useful when the supply rate of the $SiO_2$ granules is adjusted through the action of vibrations.

The dosage of the $SiO_2$ granules depends here on the degree of vibrations and is thereby more uniform and reproducible in comparison with a supply solely by gravity. The vibrations can be adjusted at different frequencies and amplitudes, so that a uniform and, if necessary, also a particularly fast and controlled supply of the granules is ensured. The vibrations can act through a vibrator on the SiO$_2$ granules; the vibrator may here simultaneously comprise a storage vessel for the SiO$_2$ granules from which the granules are fed into the crucible.

Advantageously, the SiO$_2$ granules are supplied continuously.

A continuous supply, i.e. one which is not temporarily interrupted, ensures constant melting conditions for a long production period. The readjustment of the supply on the basis of the optical detection of the width of the melt edge has only a negligible impact on the continuous supply of the SiO$_2$ granules in that the supply rate is accelerated or decelerated in response to the requirements.

It is desirable for a uniform process control when great changes in the regulating variable are avoided as much as possible. In this respect it has turned out to be advantageous when for the setting of the melt edge width to a value within the target width range a nominal supply rate of SiO$_2$ granules which is based on the throughput of the drawn-off glass mass is changed by not more than 10%.

The nominal supply rate of SiO$_2$ granules corresponds to the supply rate that is obtained purely mathematically on the basis of the quartz glass throughput. Momentary changes in this rate of less than +/−10% (based on the nominal value) have no significant impact on the drawing process. It has been found that the melt edge width can be set upon changes in the supply rate in this order (<10%) within a few minutes (<20 min) to a value within the target width range.

EMBODIMENT

The invention will now be described in more detail hereinafter with reference to a patent drawing and an embodiment. As the sole FIGURE, FIG. 1 shows an apparatus for performing the method of the invention, in a schematic representation.

SiO$_2$ granules 3 are continuously filled into a crucible 1 of tungsten via a single filling tube 2. The SiO$_2$ granules 3 are stored above the crucible 1 in a container 6 which comprises an agitator. The crucible 1 has a bottom outlet opening 4 through which a molten quartz glass mass exits and is drawn off as a strand 16.

The crucible 1 is upwardly closed with a cover 7 through which the filling tube 2 projects centrally into the crucible 1. Moreover, at least one opening is laterally provided on the cover 7; through this opening the melt surface of the softened glass mass 23 on the edge of the crucible 1 and the supplied SiO$_2$ granules 3 can be optically detected by means of an inspection device 11.

A resistance heating coil 8 is arranged around the crucible for heating the crucible 1. This coil is outwardly surrounded by a thermal insulation 9. The space between the resistance heating coil 8 and the outer wall of the crucible is flushed with a hydrogen-containing protective gas which is supplied via the nozzles 10 and 15 and discharged in the area of the lower end of the crucible 1. A helium-hydrogen gas mixture is introduced into the crucible 1 via an inlet 14 into the upper portion of the crucible interior 5.

Due to the supply of the SiO$_2$ granules 3 via the filling tube 2 a heap cone 13 which is surrounded by a surrounding melt edge 24 is formed on the melt surface 12 of the SiO$_2$ granules 3 previously fused into a softened glass mass 23.

The method of the invention is now explained in more detail with reference to an embodiment and FIG. 1.

The SiO$_2$ granules 3 are fed via the filling tube 2 from the storage container 6, which is connected to an agitator, into the crucible 1. The agitator adjusts a continuous supply of SiO$_2$ granules 3. As a rule, the agitator may also be arranged separated from the storage container and only acts on the supply line for the SiO$_2$ granules into the crucible. The supply rate of SiO$_2$ granules depends on the calculated throughput for the production of quartz glass components of a given geometry and size (tubes or rods with corresponding diameters, wall thicknesses, lengths).

The supplied SiO$_2$ granules 3 form a bulk cone 13 in the crucible 1 on the SiO$_2$ granules which have previously been molten into a softened glass mass 23. At the beginning of the drawing process the filling tube 2 is shifted vertically upwards to such an extent that a distance of about 10 cm is set between the end of the filling tube 2 and the bulk cone 13. This prevents on the one hand the formation of a sinter layer between filling tube 2 and bulk cone 13 and on the other hand the formation of a sinter crust on the inner wall of the crucible by blowing away of the SiO$_2$ granular particles.

In the crucible 1 the silica particles 3 are heated to a temperature of about 2100° C. to 2200° C. A homogeneous, bubble-free glass mass 23 on which the bulk cone 13 of SiO$_2$ particles 3 is floating is here formed in the lower portion of the crucible 1 without said cone having any contact with the wall of the crucible 1; rather, the melt surface 12 forms a surrounding melt edge 24 of a width of about 2 cm around the base area of the bulk cone.

The width of the melt edge 24 is optically detected by means of the inspection device 11. Said device comprises a camera which is arranged in the cover 7 of the crucible 1 above the melt edge 24 and by means of which an image of the melt surface 12 is recorded in the area of the melt edge 24 and measured. The camera can optionally be adjusted, deviating from an initial position, such that the edge 13.1 of the bulk cone 12 is detected. When the initial position is known, the width of the melt edge 24 can directly be determined through alignment of the camera without a picture of the full width having to be taken. The width of the melt edge 24 which is thereby determined is a control variable for the fine adjustment of the supply of the SiO$_2$ granules 3; apart from the basic control variable, in response to the throughput this variable helps to keep a surrounding melt edge 24 around the bulk cone 13 within a width between 1 cm and 2 cm (=target width range) during the melting process. Together with the optical detection of the melt edge 23, the temperature is measured and monitored in this area. To this end a pyrometer (not shown) is used that is integrated into the inspection device 11 and the measuring spot of which is transmitted by means of an optical fiber exactly onto the melt edge 24 or the edge 13.1 of the bulk cone 12 consisting of SiO$_2$ granules 3. A further pyrometer 21 may be directed at a defined distance from the first pyrometer onto the lateral surface of the bulk cone 13. The temperature of the granulation layer can thereby be detected in this position of the bulk cone 13, whereby temperature trends can be detected.

The softened glass mass 23 flows out via the bottom outlet opening 4 and is then drawn off in the form of a cylindrical quartz-glass strand 16 downwards, as illustrated by the directional arrow 17. Subsections are cut off to the desired length from the cooled quartz glass strand 16 in the form of a rod with a diameter of 30 mm.

At an average draw-off rate of the quartz glass rod of 11 m/h, one achieves a nominal supply rate of SiO$_2$ granules of about 17 kg/h.

If the width of the melt edge 24 does not reach the lower limit value of 1 cm, the supply rate of SiO$_2$ granules is reduced by 5% based on said nominal value until the lower limit is again exceeded.

Inversely, when the upper limit value of 1 cm is exceeded, the supply rate of SiO$_2$ granules is increased by about 5% based on the nominal value until the current width is within the target width range again.

This normally happens within a few minutes. This momentary increase or decrease in the nominal supply rate is so small that it has no significant impact on throughput and other process control.

The invention claimed is:

1. A method for producing a glass body with high silicic-acid content, said method comprising:
   supplying SiO$_2$ granules from above into an elongated, substantially cylindrical crucible,
   heating the SiO$_2$ granules to a softening temperature, so that a softened glass mass comprising a melt surface is formed,
   drawing off the softened glass mass via a bottom opening of the crucible so as to form a glass strand, and
   cutting the glass strand to a length to obtain the glass body,
   wherein the supplying of the SiO$_2$ granules causes a bulk heap to be formed that partly covers the melt surface while leaving a melt edge not covered by said bulk heap, and
   the method further comprising
   optically detecting the melt surface,
   wherein during the optical detecting of the melt surface a width of at least a sub-section of the melt edge is determined consecutively and is set to a value within a target width range by setting a supply rate of the SiO$_2$ granules; and
   wherein the width of the melt edge is set to a value within the target width range by a nominal supply rate of SiO$_2$ granules based on a throughput of the drawn-off glass mass, and wherein the nominal supply rate is changed by not more than 10%.

2. The method according to claim 1, wherein the supply rate of the SiO$_2$ granules is set such that the melt edge formed has a width between 0.5 cm and 4 cm.

3. The method according to claim 1, wherein the optical detecting of the melt surface comprises a temperature measurement.

4. The method according to claim 3, wherein the temperature measurement is carried out using at least one pyrometer that is directed to a position on an edge of the bulk heap.

5. The method according to claim 1, wherein the optical detecting of the melt surface comprises an imaging of the melt edge with an at least one camera.

6. The method according to claim 1, wherein the optical detecting of the melt surface comprising an imaging detection combined with a temperature measurement, and wherein a camera is used with a pyrometer.

7. The method according to claim 6, wherein the camera is directed to a position on an edge of the bulk heap.

8. The method according claim 1, wherein the SiO$_2$ granules are supplied via an individual filling tube terminating centrally above the bulk heap, and a distance ranging from 5 cm to 20 cm is set between the end of the filling tube and the bulk heap.

9. The method according to claim 1, wherein the supply rate of the SiO$_2$ granules is adjusted using vibrations.

10. The method according to claim 1, wherein the SiO$_2$ granules are supplied continuously.

11. The method according to claim 1, wherein the supply rate of the SiO$_2$ granules is set such that a surrounding melt edge is formed with a width between 1 cm and 2 cm.

12. The method according claim 1, wherein the SiO$_2$ granules are supplied via an individual filling tube terminating centrally above the bulk heap, and a distance ranging from 5 cm to 20 cm is set between the end of the filling tube and the bulk heap.

13. The method according to claim 1, wherein the nominal supply rate of the SiO$_2$ granules is adjusted using vibrations.

14. The method according to claim 1, wherein the SiO$_2$ granules are supplied continuously at the varying nominal supply rate.

15. A method for producing a glass body with high silicic-acid content, said method comprising:
    supplying SiO$_2$ granules from above into a substantially cylindrical crucible,
    heating the SiO$_2$ granules to a softening temperature, so that a softened glass mass comprising a melt surface is formed,
    drawing off the softened glass mass via a bottom opening of the crucible so as to form a glass strand, and
    cutting the glass strand to a length to obtain the glass body,
    wherein the supplying of the SiO$_2$ granules causes a bulk heap to be formed that partly covers the melt surface while leaving a melt edge not covered by said bulk heap, and
    the method further comprising
    optically detecting the melt surface so as to repeatedly determine a width of at least a sub-section of the melt edge of the melt surface; and
    controlling a nominal supply rate of the SiO$_2$ granules based on a throughput of the glass mass drawn off as the strand so as to maintain the determined width of the melt edge within a target width range.

16. The method according to claim 15, wherein the nominal supply rate varies within a range of plus or minus 10% of a supply rate value.

17. The method according to claim 15, wherein the nominal supply rate of the SiO$_2$ granules is set such that the melt edge formed has a width between 0.5 cm and 4 cm.

18. The method according to claim 15, wherein the supply rate of the SiO$_2$ granules is set such that a surrounding melt edge is formed with a width between 1 cm and 2 cm.

19. The method according to claim 15, wherein the optical detecting of the melt surface comprises a temperature measurement carried out using at least one pyrometer that is directed to a position on an edge of the bulk heap.

20. The method according to claim 15, wherein the optical detecting of the melt surface comprises an imaging of the melt edge with an at least one camera directed to a position on an edge of the bulk heap.

21. The method according to claim 15, wherein the optical detecting of the melt surface comprising an imaging detection combined with a temperature measurement, and wherein a camera is used with a pyrometer.

* * * * *